(12) United States Patent
Aida et al.

(10) Patent No.: US 7,700,205 B2
(45) Date of Patent: *Apr. 20, 2010

(54) PROCESS FOR MANUFACTURING GLASS SUBSTRATE FOR MAGNETIC RECORDING MEDIUM, GLASS SUBSTRATE FOR MAGNETIC RECORDING MEDIUM OBTAINED BY THE PROCESS, AND MAGNETIC RECORDING MEDIUM OBTAINED USING THE SUBSTRATE

(75) Inventors: Katsuaki Aida, Ichihara (JP); Hiroyuki Machida, Ichihara (JP); Kazuyuki Haneda, Ichihara (JP)

(73) Assignee: Showa Denko K.K., Tokyo (JP)

( * ) Notice: Subject to any disclaimer, the term of this patent is extended or adjusted under 35 U.S.C. 154(b) by 113 days.

This patent is subject to a terminal disclaimer.

(21) Appl. No.: 11/660,667

(22) PCT Filed: Aug. 4, 2005

(86) PCT No.: PCT/JP2005/014706

§ 371 (c)(1),
(2), (4) Date: Feb. 21, 2007

(87) PCT Pub. No.: WO2006/022146

PCT Pub. Date: Mar. 2, 2006

(65) Prior Publication Data

US 2008/0028793 A1    Feb. 7, 2008

Related U.S. Application Data

(60) Provisional application No. 60/606,420, filed on Sep. 2, 2004.

(30) Foreign Application Priority Data

Aug. 27, 2004    (JP) .............................. 2004-248262

(51) Int. Cl.
C03C 23/00    (2006.01)
C03C 19/00    (2006.01)
G11B 5/73    (2006.01)
G11B 5/85    (2006.01)

(52) U.S. Cl. .................. 428/846.9; 428/848.8; 65/30.1; 65/54; 510/454

(58) Field of Classification Search ................... 451/28, 451/36, 37, 41, 57, 63, 42; 65/30.14, 30.1, 65/54; 428/65.3, 846.9, 141, 848.8, 692, 428/691; 438/691, 692, 759; 510/452, 454, 510/483; 252/179

See application file for complete search history.

(56) References Cited

U.S. PATENT DOCUMENTS

| | | | |
|---|---|---|---|
| 6,568,995 B1 * | 5/2003 | Mitani et al. ................... 451/36 |
| 7,531,043 B2 * | 5/2009 | Machida et al. .......... 428/846.9 |
| 2001/0051746 A1 * | 12/2001 | Hagihara et al. ............ 562/400 |
| 2002/0061603 A1 | 5/2002 | Eto |
| 2002/0098701 A1 * | 7/2002 | Hasegawa .................... 438/692 |
| 2002/0121110 A1 * | 9/2002 | Saito et al. ................. 65/30.14 |
| 2003/0064196 A1 * | 4/2003 | Kurachi et al. .............. 428/141 |
| 2004/0241379 A1 * | 12/2004 | Horie et al. ................. 428/65.3 |
| 2005/0287931 A1 * | 12/2005 | Saegusa et al. ................. 451/41 |

FOREIGN PATENT DOCUMENTS

| | | |
|---|---|---|
| JP | 2000-348338 A | 12/2000 |
| JP | 2001-26460 A | 1/2001 |
| JP | 2004-86930 A | 3/2004 |

OTHER PUBLICATIONS

JP 2004-86930 English translation.*

* cited by examiner

*Primary Examiner*—Kevin M. Bernatz
*Assistant Examiner*—Louis Falasco
(74) *Attorney, Agent, or Firm*—Sughrue Mion, PLLC

(57) ABSTRACT

A process for manufacturing a glass substrate for a magnetic recording medium comprising polishing a crystallized glass substrate using abrasive grains, and then washing the substrate using an aqueous organic carboxylic acid solution; a glass substrate for a magnetic recording medium which is manufactured by the process; and a magnetic recording medium obtained using the substrate. A glass substrate for a magnetic recording medium is manufactured, whereby the surface roughness is low and the surface defects are minimal for washing after polishing of a crystallized glass substrate, and wherein the Read-Write performance are not impaired when a recording layer including a magnetic film is formed on the magnetic recording medium substrate for manufacturing a magnetic recording medium.

3 Claims, No Drawings

PROCESS FOR MANUFACTURING GLASS SUBSTRATE FOR MAGNETIC RECORDING MEDIUM, GLASS SUBSTRATE FOR MAGNETIC RECORDING MEDIUM OBTAINED BY THE PROCESS, AND MAGNETIC RECORDING MEDIUM OBTAINED USING THE SUBSTRATE

CROSS-REFERENCE TO RELATED APPLICATION

This application is an application filed under 35 U.S.C. §111(a) claiming benefit of priority pursuant to 35 U.S.C. §119(e)(1) of the filing date of the Provisional Application 60/606,420 filed Sep. 2, 2004, pursuant to 35 U.S.C. §111(b).

TECHNICAL FIELD

The present invention relates a process for manufacturing a glass substrate for a magnetic recording medium, to a glass substrate for a magnetic recording medium which is obtained by the process, and to a magnetic recording medium which is obtained using the panel. More specifically, the invention relates to a process for manufacturing a glass substrate for a magnetic recording medium wherein a crystallized glass substrate is polished and then washed prior to texturing treatment, as well as to a glass substrate for a magnetic recording medium which is obtained by the process and a magnetic recording medium which is obtained using the panel.

BACKGROUND ART

Glass substrates used for magnetic recording media such as hard disks must have a high degree of flatness and smoothness, as well as surface cleanliness. Glass substrates are therefore subjected to a step for surface polishing and a subsequent step for washing. The glass substrates for magnetic recording media which are obtained by such processes are also subjected to a texturing step as a manufacturing step for the magnetic recording media.

Efficient polishing of glass substrate surfaces is accomplished by using abrasive grains such as of cerium oxide as a polishing agent, but a problem is encountered when such abrasive grains remain on the glass surface after polishing. As a result, it is necessary to remove the adhered abrasive grains and glass shavings produced during the polishing step by washing prior to the texturing step. Because of increasing recording densities, even trace amounts of washing residue can be a source of defects when the magnetic recording medium is manufactured, and therefore a demand exists for more extensive washing techniques.

Glass currently used as substrates for magnetic recording media is largely divided into amorphous glass and crystallized glass, which is designed to exhibit improved strength by having minute crystal grains deposited in the glass through a crystallization process.

The use of organic acids or inorganic acids for washing of amorphous glass substrates is known in the prior art. For example, for manufacturing magnetic recording medium glass substrates composed of amorphous glass, there has been disclosed a technique of washing with oxalic acid after the texturing step (see Japanese Unexamined Patent Publication No. 2003-212603). Also disclosed is a technique of washing amorphous glass substrates with oxalic acid after chemical strengthening treatment (see Japanese Unexamined Patent Publication No. 2004-2163).

On the other hand, treatment of crystallized glass substrates with aqueous solutions of inorganic strong acids such as hydrofluoric acid, sulfuric acid, nitric acid, phosphoric acid or hydrochloric acid has been disclosed (see Japanese Unexamined Patent Publication No. 2000-311336), while treatment of glass substrates with strong alkalis has been disclosed as well (see Japanese Unexamined Patent Publication No. 2000-302482).

The present inventors have found that, although these washing methods are somewhat effective for removal of the polishing agent and the trace metal impurities or particles which adhere as contaminants during the processing steps, they create problems such as increased roughness of the crystallized glass substrate surfaces during their washing, and more frequent defects due to minute imperfections in the substrates.

In addition, it was found that when a magnetic recording medium is manufactured by forming a recording layer including a magnetic film on the substrate, the surface shape changes described above produce a phenomenon of impaired electromagnetic conversion properties, while it was demonstrated that washing of crystallized glass with a strong acid or strong alkali causes impairment of the quality of the magnetic recording medium.

DISCLOSURE OF INVENTION

It is therefore an object of the present invention to provide a process for manufacturing a glass substrate for a magnetic recording medium whereby the surface roughness is low and the surface defects are minimal for washing after polishing of a crystallized glass substrate, and wherein the Read-Write performance is not impaired when a recording layer including a magnetic film is formed on the obtained substrate for a magnetic recording medium; it is another object to provide a glass substrate for a magnetic recording medium exhibiting excellent characteristics, which is obtained by the aforementioned process, and a magnetic recording medium exhibiting excellent characteristics which is obtained using the substrate.

The present inventors found that the aforementioned problems can be overcome if the washing treatment after polishing of the crystallized glass substrate is carried out using not a strong alkali or a strong acid but rather a weak organic carboxylic acid, and the present invention has been completed on the basis of this finding.

The present invention therefore comprises the following aspects.

[1] A process for manufacturing a glass substrate for a magnetic recording medium comprising polishing a crystallized glass substrate is polished using abrasive grains, and then washing the substrate using an aqueous organic carboxylic acid solution.

[2] A process for manufacturing a glass substrate for a magnetic recording medium according to [1] above, wherein the organic carboxylic acid is oxalic acid, acetic acid, tartaric acid, citric acid, gluconic acid, succinic acid, malic acid or malonic acid.

[3] A process for manufacturing a glass substrate for a magnetic recording medium according to [1] or [2] above, wherein the concentration of the aqueous organic carboxylic acid solution is 0.1-10% by mass.

[4] A process for manufacturing a glass substrate for a magnetic recording medium according to any one of [1] to [3] above, wherein the washing is carried out at a temperature of 10-80° C.

[5] A glass substrate for a magnetic recording medium which is manufactured by a process according to any one of [1] to [4] above.

[6] A magnetic recording medium manufactured using a glass substrate for a magnetic recording medium according to [5] above.

According to the invention, it is possible to provide glass substrates for magnetic recording media which have low surface roughness, few surface defects and minimal impairment of the Read-Write performance for manufactured magnetic recording media.

BEST MODE FOR CARRYING OUT THE INVENTION

A preferred embodiment of the invention will now be described. However, the following explanation focuses specifically on a preferred example of carrying out the invention and is not intended to place any restrictions whatsoever on the scope of the invention.

According to the invention, the glass substrate used is preferably sheet-like glass composed of crystallized glass.

The glass substrate, after being subjected to several pre-treatment steps described in detail below, is polished. Abrasive grains such as of cerium oxide, zirconium oxide, aluminum oxide, silicon oxide or the like may be used as the polishing agent for polishing of the glass substrate surface. Abrasive grains composed of cerium oxide are preferred among these from the viewpoint of polishing efficiency. The polishing agent may be used as a suspension of the abrasive grains in water.

The polished glass substrate is then subjected to a washing step. According to the invention, the washing is carried out using an aqueous solution of an organic carboxylic acid. As examples of organic carboxylic acids which may be advantageously used there may be mentioned oxalic acid, acetic acid, tartaric acid, citric acid, gluconic acid, succinic acid, malic acid and malonic acid, with oxalic acid being particularly preferred.

The preferred concentration for the organic carboxylic acid in the aqueous organic carboxylic acid solution will vary depending on the acid used, but in most cases the concentration is preferably 0.1-10% (wt %, hereinafter indicated only by "%"), more preferably 0.3-7% and most preferably 1-5%.

The washing with the aqueous organic carboxylic acid solution will generally involve dipping of the glass substrate into the aqueous organic carboxylic acid solution. In this case, the dipping temperature is preferably 10-80° C., more preferably 30-70° C. and most preferably 40-60° C. Usually a higher washing temperature will result in greater washing efficiency, but will tend to promote drying of the surface during transport from the organic acid washing bath to the next bath, and sometimes can create washing failures or defects such as drying spots.

From the standpoint of productivity, the dipping time is preferably 1-3 minutes and most preferably about 2 minutes, but because of the extremely low etching property of the substrate surface, there is no restriction against prolonged dipping.

Since a large portion of the polishing agent will adhere to the glass substrate surface after polishing, according to the invention it is preferably subjected to mechanical washing such as ordinary brush scrubbing prior to washing with the aqueous organic carboxylic acid solution.

Also, for an increased washing effect it is common to combine the dip washing step with ordinary ultrasonic washing during, and according to the invention as well, the washing effect can be enhanced by also utilizing ultrasonic waves.

After adequately rinsing the organic carboxylic acid off with water, drying is carried out with IPA (IsoPropyl Alcohol) vapor to obtain a glass substrate for a magnetic recording medium. For subsequent manufacturing the magnetic recording medium, the glass substrate for a magnetic recording medium is first subjected to a texturing step, and then a magnetic film is formed on the surface by an ordinary procedure, thereby fabricating a magnetic recording medium. The texturing step may sometimes omitted, however. The washing treatment described above also results in excellent advantages of the resulting glass substrate for a magnetic recording medium, in that it is possible to manufacture a glass substrate for a magnetic recording medium wherein the surface roughness is reduced, the number of surface defects is lower, and impairment of the Read-Write performance is minimized when a magnetic recording medium is manufactured by forming a recording layer including a magnetic film on the obtained substrate for a magnetic recording medium.

The present invention will now be explained in greater detail through the following example.

Substrates for magnetic recording media were manufactured using crystallized glass obtained using a starting material composed of 77% $SiO_2$, 11% $Li_2O$, 4% $Al_2O_3$ and 3% MgO as the major components.

First, the raw material glass having the aforementioned composition was melted at a temperature of about 1350-1500° C. using a melting apparatus, blended and then press molded and cooled to obtain a disk-shaped glass sheet with a diameter of 66 mmφ and a thickness of about 1 mm. After heat treating the sheet at 540° C. for about 5 hours to form crystal nuclei, the crystals were grown for about 2 hours at a temperature of 780° C., to obtain crystallized glass having dispersed on the glass surface particles comprising a crystal phase of lithium disilicate and α-quartz, with aggregated α-quartz.

A hole was formed at the center of the glass sheet using a cylindrical grindstone. Next, the main surface of the panel was subjected to two-stage lapping process comprising loose lapping and tight lapping, using a double-sided polishing apparatus employing diamond pellets, for adjustment of the panel thickness and surface roughness. The inner edge facing the hole and the outer peripheral edge of the panel were each subjected to chamfering with a grindstone, using inner and outer processing units, respectively, to form chamfered edges.

After polishing the inner edge and the outer peripheral edge of the processed glass substrate to a mirror surface, the main surface of the panel was finally polished to a mirror surface using a double-sided polishing apparatus. The polishing was carried out in two stages of rough polishing and fine polishing, where the polishing agent used was a cerium oxide powder-containing polishing agent (ROX by Showa Denko Co., Ltd.). A commercially available urethane or suede pad was selected for the polishing, and the polishing conditions were selected for a final surface roughness of about 3 Å with an AFM.

Each obtained panel was then washed by brush scrubbing. Next, it was washed by dipping under the different washing conditions shown in Table 1 below for removal of the surface residue to obtain a glass substrate for a magnetic recording medium, and then the surface roughness and surface defects of each substrate were evaluated.

Sodium hydroxide was selected as the alkali-based washing agent, while hydrofluoric acid and the organic acid oxalic acid were selected as acid-based washing agents. The concentration and temperature of the washing solution were set as shown in the table, and after 1-3 repeated washings in each chemical solution bath to confirm the washing effects, a prescribed protocol of rinsing and drying were carried out. A 120 kHz ultrasonic generating apparatus was also mounted in the chemical solution bath.

The reference conditions used were a chemical bath containing no washing solution ("ref" in Table 1).

The surface roughness (Ra) was evaluated in a 10 μm field using an AFM (Atomic Microscope) by Digital Instruments.

The surface defects were evaluated in a 10 nm slice using an RZ3500 ODT (Optical Defect Tester) by Hitachi Hightechnology.

The ODT P column in Table 1 represents the counted raised defects and the N column represents pit defects, with smaller values indicating a lower number of defects in the surface. The size of a "defect" was considered to be a minimum of about 0.3 μm.

Exactly the same pattern was exhibited for hydrofluoric acid washing.

Only in the case of washing with an organic acid (oxalic acid) as according to the invention it was possible to achieve fewer surface defects without increasing the roughness of the glass substrate surface or causing impairment of the Read-Write performance of the magnetic recording medium with repeated washing.

As a result of exactly identical examination of other organic acid washing solutions in addition to oxalic acid, the present inventors have discovered for the first time that only with organic acid washing of a crystallized glass substrate after polishing is it possible to provide glass substrates for magnetic recording media having low surface roughness and few surface defects, while producing no impairment of the Read-Write performance for manufactured magnetic recording media.

TABLE 1

|  | Washing conditions | | | | | ODT | | Read-Write performance |
|---|---|---|---|---|---|---|---|---|
| No. | Chemical solution | Concentration | Temperature | Number of washings | AFM Ra (Å) | P | N | ref Ratio (dB) |
| 1 (ref) | — | — | Room temp. | 1 | 3.1 | 110.7 | 78.5 | 0.00 |
| 2 | NaOH | 0.2 wt % | 40° C. | 1 | 3.3 | 73.3 | 52.8 | −0.25 |
| 3 | | | | 2 | 4.5 | 25.0 | 21.6 | −0.39 |
| 4 | | | | 3 | 5.3 | 10.3 | 8.9 | −0.52 |
| 5 | HF | 0.1 wt % | 40° C. | 1 | 4.4 | 7.0 | 4.7 | −0.40 |
| 6 | | | | 2 | 4.9 | 6.9 | 6.6 | −0.62 |
| 7 | | | | 3 | 5.5 | 6.3 | 8.3 | −0.82 |
| 8 | Oxalic | 3 wt % | 60° C. | 1 | 3.2 | 8.8 | 7.2 | 0.02 |
| 9 | acid | | | 2 | 3.4 | 7.4 | 7.1 | 0.03 |
| 10 | | | | 3 | 3.3 | 6.7 | 6.5 | 0.01 |

Next, the obtained substrate was subjected to texturing treatment using a diamond slurry and a nonwoven fabric, and was then mounted in a sputtering apparatus for sputtering to form a base film composed of a chromium alloy and a magnetic film composed of a cobalt alloy on both sides of the substrate, after which a diamond-like carbon film was formed thereover by CVD and the film was coated with Fonblin Z-Tetraol (Solvay Solexis) as a lubricant to manufacture a magnetic recording medium. The total thickness of the film formed by sputtering was 90 nm, and the thickness of the film formed by CVD was 10 nm. Twenty-five such magnetic recording media were manufactured in this manner, and the Read-Write performance (SN ratio) of each magnetic recording medium was evaluated using a Read-Write performance measuring device by Guzik Technical Enterprises. The Read-Write performance was evaluated based on the degree of change with respect to the SN ratio of output (S) and noise (N) for a medium obtained under conditions with no washing solution other than water ("ref" in Table 1).

A larger value may be considered preferable in terms of design of the magnetic recording medium.

The results are summarized in Table 1.

First, for washing with sodium hydroxide, it is seen that the roughness of the glass substrate surface increased with repeated washing, while the number of surface defects decreased.

However, the Read-Write performance decreased linearly with respect to the reference upon repeated washing, indicating that the performance as a magnetic recording medium became gradually impaired.

INDUSTRIAL APPLICABILITY

The present invention provides glass substrates for magnetic recording media having low surface roughness and few surface defects, while producing no impairment of the Read-Write performance for manufactured magnetic recording media, and it may therefore be advantageously applied for manufacturing magnetic recording media.

The invention claimed is:

1. A process for manufacturing a glass substrate for a magnetic recording medium, comprising polishing a crystallized glass substrate using abrasive grains, and then washing the substrate with an aqueous solution comprising oxalic acid and no strong acid, and wherein washing of the substrate after the polishing with the abrasive grains is not carried out with a strong acid or a strong base.

2. A process for manufacturing a glass substrate for a magnetic recording medium according to claim 1, wherein the concentration of the aqueous organic carboxylic acid solution is 0.1-10% by mass.

3. A process for manufacturing a glass substrate for a magnetic recording medium according to claim 1, wherein the washing is carried out at a temperature of 10-80° C.

* * * * *